July 9, 1929.  C. A. KELSEY  1,719,889
MULTISPEED MOTOR CONTROL
Filed Oct. 6, 1927
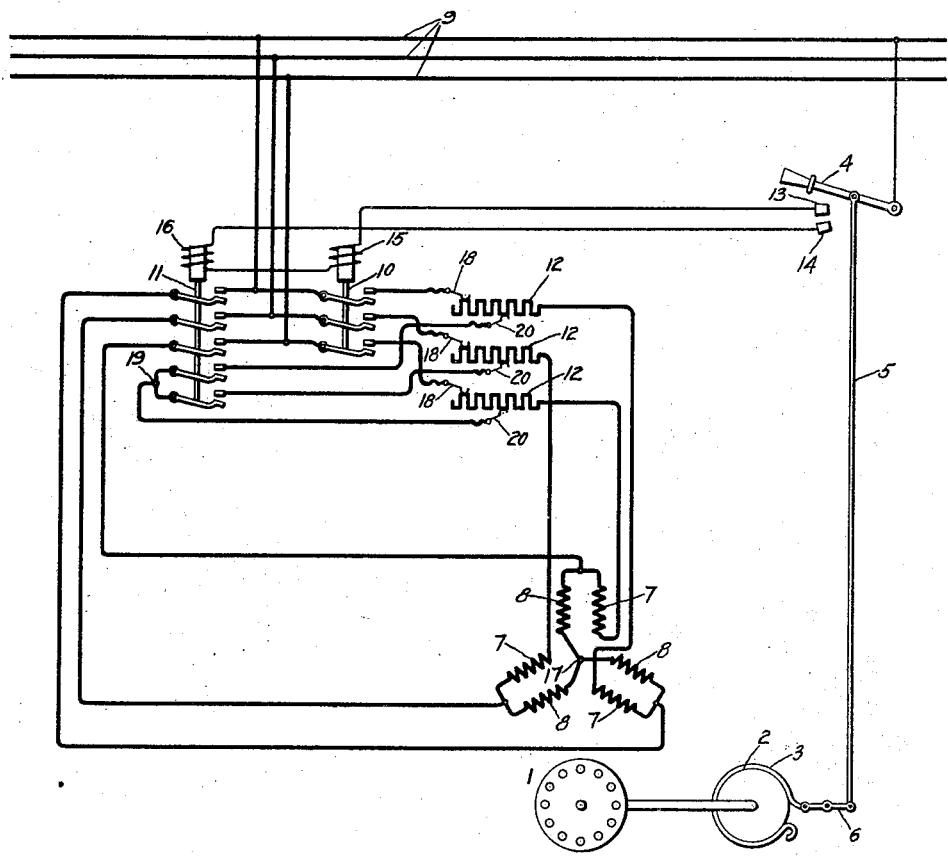
Inventor:
Charles A. Kelsey,
by *Alexander S. Lunt*
His Attorney.

Patented July 9, 1929.

1,719,889

UNITED STATES PATENT OFFICE.

CHARLES A. KELSEY, OF SCHENECTADY, NEW YORK, ASSIGNOR TO GENERAL ELECTRIC COMPANY, A CORPORATION OF NEW YORK.

MULTISPEED MOTOR CONTROL.

Application filed October 6, 1927. Serial No. 224,300.

My invention relates to the control of multispeed motors and more particularly to the control of alternating current motors of the pole changing multi-speed type wherein resistance is employed to vary the accelerating and driving torque of the motor at the various speeds.

The principal object of my invention is to provide an improved control for a pole changing two-speed alternating current motor that enables the torque characteristics of the motor at each speed to be varied by means of a common resistor connected in the circuit of the motor, this resistor being independently adjustable for controlling the torque at each of the two operating speeds of the motor. An adjustable reactor or other suitable torque regulating means may be employed instead of the resistor if desired.

One of the usual forms of pole changing alternating current two-speed motor is provided with groups of field coils in each phase adapted to be connected in series circuit Y for the low speed operation of the motor and in multiple circuit Y for high speed operation of the motor. In accordance with the preferred form of my present invention an adjustable torque regulating resistor is connected with the groups of motor field coils so that the same resistor provides variable torque control for both low and high speed operation of the motor. The connection is such that for low speed operation the torque regulating resistor is inserted in the series Y circuit of the field coils, while for high speed operation the same torque regulating resistor is included in only one of the two multiple Y circuits of the motor field coils. This manner of including the torque regulating resistor in only one of the two multiple Y circuits of the motor field coils in the high speed operating connection materially lessens the expenditure of energy in the resistor to produce a given torque variation and also greatly simplifies the switching mechanism required for controlling the operation of the two-speed motor. Also the regulating resistor need have only the current carrying the capacity of one of the multiple connected groups of the motor field coils instead of both.

The single figure of the accompanying drawing shows diagrammatically a preferred form of control for a two-speed pole changing type of three phase alternating current motor in accordance with the present invention.

As shown, the alternating current motor 1 is of the three phase, squirrel cage type having pole changing field windings arranged to provide a high and a low operating speed for the motor. Although not shown in the drawing, the motor 1 is coupled through suitable mechanical gearing to drive a variable speed machine such as a sugar centrifugal or the like. For use in stopping such a machine a brake ordinarily is provided, the brake being conventionally shown as a drum 2 having a braking band 3 arranged to be controlled by the control lever 4 connected through the rod 5 and the pivoted lever 6. The field windings of the motor 1 are shown as of the usual form comprising the groups of coils 7 and 8 for each phase. The groups of field coils 7 and 8 are arranged to be connected in series Y circuit to the supply lines 9 through the contactor 10 for low speed operation of the motor. For high speed operation of the motor the groups of field coils 7 and 8 are connected in multiple Y circuit to the supply lines 9 by means of the contactor 11. Thus, it will be observed that both groups of field coils 7 and 8 are energized for both high and low speed operation of the motor.

In accordance with my present invention the torque regulating resistor 12 is connected with the pole changing windings 7 and 8 of the motor 1 so that the resistor 12 serves to regulate the torque characteristics of the motor during both low and high speed operation. In order to simplify the control of the motor 1, the control lever 4 may be arranged to operate as a master switch as indicated in the drawing to control the energization of the operating windings 15 and 16 of the respective low speed and high speed line contactors 10 and 11 upon engagement with tne cooperating master switch contact segments 13 and 14.

The operation of the control system illustrated is as follows: When the control lever 4 is in the position shown in the drawing, the contactors 10 and 11 are open and the band 3 grips the brake drum 2 and holds the motor at rest.

To start the motor the control lever 4 is moved to engage with the contact segment 13. This releases the band 3 and at the same time completes the circuit energizing the solenoid 15. Operation of this solenoid closes the contacts 10 which connects the field windings 7 and 8 and the resistor 12 in series Y circuit to the supply lines 9. The circuit of each phase now is from the supply line 9 through contractor 10, resistor 12, field winding 7, field winding 8 to the neutral 17. With the motor pole changing windings thus connected in series circuit Y, the motor will operate at the low speed with a torque dependent upon the value of the resistor 12. The resistor 12 preferably is provided with the adjustable connections 18 in order to permit variation of the amount of the resistor 12 included in the series Y circuit of the motor pole changing windings. In this way the low speed torque characteristic of motor 1 may be regulated as desired.

For high speed operation the control lever 4 is moved to engage with the contact segment 14 which completes the circuit energizing the solenoid 16. This closes the contactor 11 which connects the field windings 7 and 8 of each phase group in multiple to the supply lines 9. The pole changing windings of the motor now provide multiple paths for the line current. One path extends directly through the windings 8 to the neutral 17. The other path extends through the windings 7 and a portion of the resistor 12 to another neutral 19 which is in circuit only when the contactor 11 is closed. The motor now operates at the high speed with a torque dependent upon the amount of the resistor 12 included in one of the multiple paths. In order to permit independent adjustment of the resistor 12 for high speed operation of the motor, the adjustable connections 20 are provided.

In stopping, the motor is first disconnected from the high speed connection and then connected to the low speed connection and then again disconnected and the brake applied. Obviously, the motor acts as an induction generator, returning power to the line while connected for low speed and running above its synchronous low speed. This characteristic may be made use of for braking purposes if desired.

While I have described the principle of operation of my invention, together with the apparatus which I now consider to represent the best embodiment thereof, I would have it understood, that the apparatus shown is only illustrative and that the invention may be carried out by other means.

What I claim as new and desire to secure by Letters Patent of the United States, is,—

1. The combination of a multi-speed motor having pole changing windings, regulating means connected with said windings to be effective in controlling the torque characteristics of the motor with the said windings connected for different operating speeds of the motor, and independent adjusting means for the said regulating means for each operating speed of the motor.

2. The combination of a multi-speed alternating current motor having pole changing windings, a torque controlling resistor therefor, and switching means whereby said windings are connected to the power lines to provide different numbers of poles for operation of the motor at different speeds, said switching means connecting said windings through different portions of said resistor for the different motor speeds.

3. The combination of a multi-speed alternating current motor having pole changing field windings, switching means for connecting said field windings in series circuit Y for low speed operation of the motor and in multiple circuit Y for high speed operation of the motor, regulating means connected with said field windings to be effective for regulating the torque characteristics of the motor during operation at each speed, and independent adjusting means for the said regulating means for each operating speed of the motor.

4. The combination of a multi-speed alternating current motor having pole changing field windings and a resistor for controlling the starting of the motor at low speed, means for adjusting the said resistor for low speed operation, switching means for changing the poles of the field windings to effect high speed operation of the motor, said switching means connecting said windings with said resistor for adjusting the accelerating torque of the motor during high speed operation, and independent adjusting means for said resistor for high speed operation.

5. A control system for a two-speed induction motor having pole changing field windings comprising a regulating resistor, a source of alternating current supply for said motor, a master switch having a low speed position and a high speed position, and electroresponsive switch mechanism and connections whereby operating the said master switch to low speed position connects the motor field windings to said source of supply through said resistor for operation with one number of poles and operating the said master switch to full speed position connects the motor field windings to said source of supply through a portion of the said resistor for operation with a different number of poles.

6. A control system for a two-speed induction motor having pole changing field windings, comprising a regulating resistor, a master switch having a low speed position and a high speed position, and electroresponsive switch mechanism and connections whereby operating the said master switch to low speed position connects the field winding in series circuit Y to the power lines through said resistor, and operating the said master switch to high speed position connects the field winding in multiple circuit Y to the power lines through a portion of the same resistor.

7. The combination of an alternating current motor having two field windings in each phase, a regulating resistor therefor, switching means whereby the said field windings are connected in series to the power lines through said resistor for low speed operation and whereby for full speed operation the said field windings are connected in parallel to the power lines with the said resistor connected in one of the two parallel circuits.

8. A control system for a two-speed induction motor having pole changing field windings comprising a regulating resistor, a source of alternating current supply for said motor, a master switch having a low speed position and a high speed position, electro-responsive switching mechanism and connections whereby operating said master switch to its low speed position connects the motor field windings to said supply source through a portion of said resistor for operation with one number of poles and operating said master switch to its high speed position connects the motor field windings to said supply source through a portion of said resistor for operation with a different number of poles, and means for independently adjusting the portions of said resistor through which said windings are connected for the low and high speed operations.

In witness whereof, I have hereunto set my hand this 5th day of October, 1927.

CHARLES A. KELSEY.

CERTIFICATE OF CORRECTION.

Patent No. 1,719,889.  Granted July 9, 1929, to

CHARLES A. KELSEY.

It is hereby certified that error appears in the printed specification of the above numbered patent requiring correction as follows: Page 1, line 48, strike out the word "the" first occurrence; page 2, line 3, for "contractor" read "contactor"; and that the said Letters Patent should be read with these corrections therein that the same may conform to the record of the case in the Patent Office.

Signed and sealed this 6th day of August, A. D. 1929.

(Seal)

M. J. Moore,
Acting Commissioner of Patents.